United States Patent [19]

Schmeling et al.

[11] Patent Number: 4,463,244

[45] Date of Patent: Jul. 31, 1984

[54] AIR CORE TYPE CURRENT PULSE AND POWER FACTOR MONITORING AND CONTROL SYSTEM FOR A RESISTANCE WELDING APPARATUS

[75] Inventors: William H. Schmeling, Wauwatosa; Dennis J. Jurek, Grafton, both of Wis.

[73] Assignee: Square D Company, Palatine, Ill.

[21] Appl. No.: 328,211

[22] Filed: Dec. 7, 1981

[51] Int. Cl.³ ............................................. B23K 11/24
[52] U.S. Cl. ..................................... 219/110; 219/114
[58] Field of Search ................. 219/110, 109, 114, 108

[56] References Cited

U.S. PATENT DOCUMENTS

| | | | |
|---|---|---|---|
| 2,748,380 | 5/1956 | Platte et al. | 219/109 |
| 4,104,724 | 8/1978 | Dix et al. | 219/108 |
| 4,254,466 | 3/1981 | Jurek | 219/110 |
| 4,289,948 | 9/1981 | Jurek et al. | 219/110 |
| 4,289,951 | 9/1981 | Jurek | 219/114 |

*Primary Examiner*—C. C. Shaw
*Attorney, Agent, or Firm*—William H. Schmeling; Richard T. Guttman

[57] ABSTRACT

A monitoring and control system for a resistance welding apparatus. The system monitors the quality of a weld as a weld is formed and terminates the welding current when a quality weld is completed. The monitoring function is performed by detecting a change in the instant welding current is extinguished at the end of half cycles of welding current in the secondary winding circuit of the welding transformer. The weld current is terminated when a detected charge in the instant current is extinguished relative to a reference equals a preprogrammed value which is indicative of an acceptable quality weld between welded parts.

8 Claims, 8 Drawing Figures

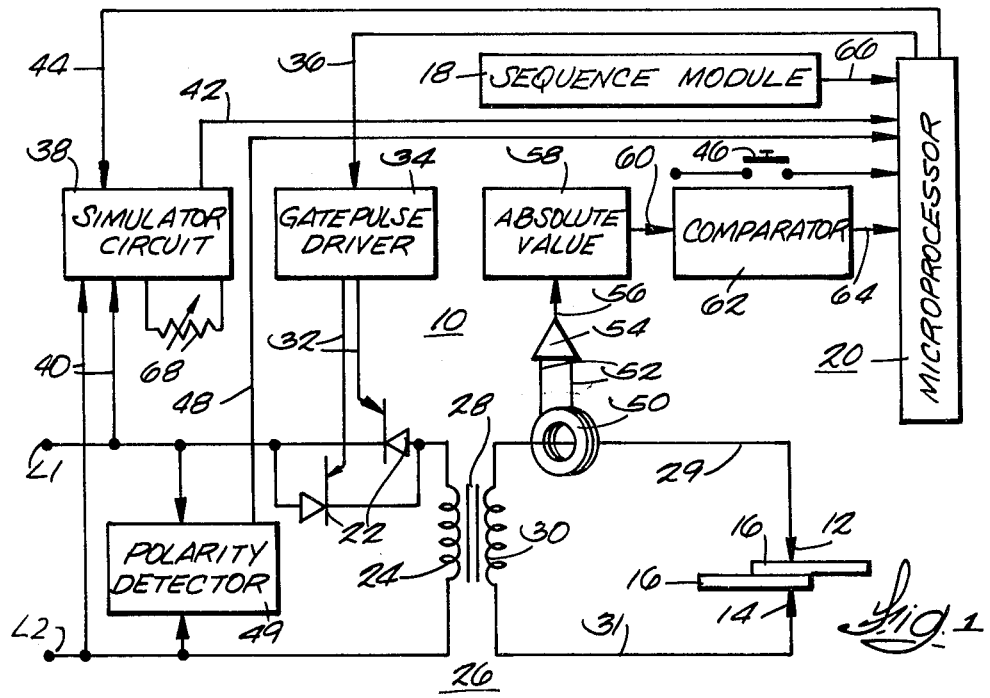
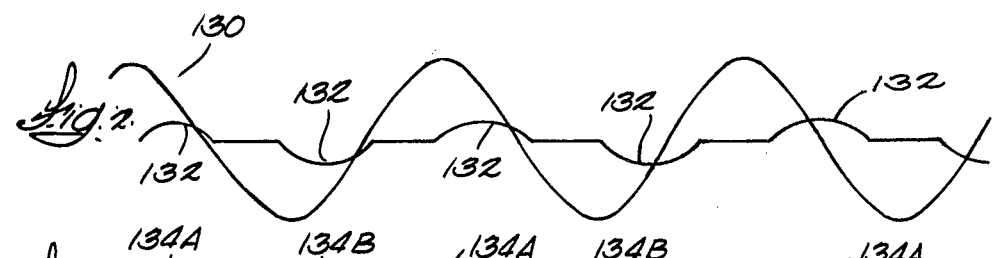
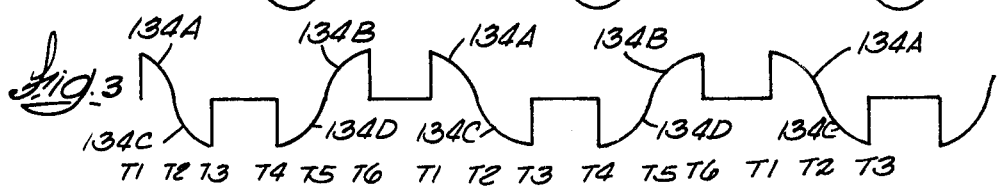
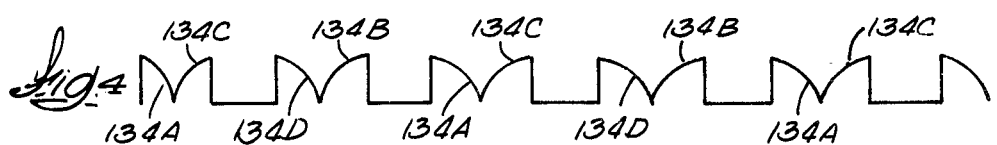
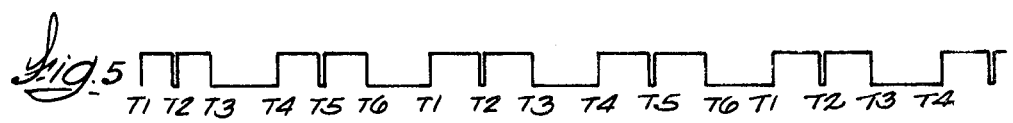

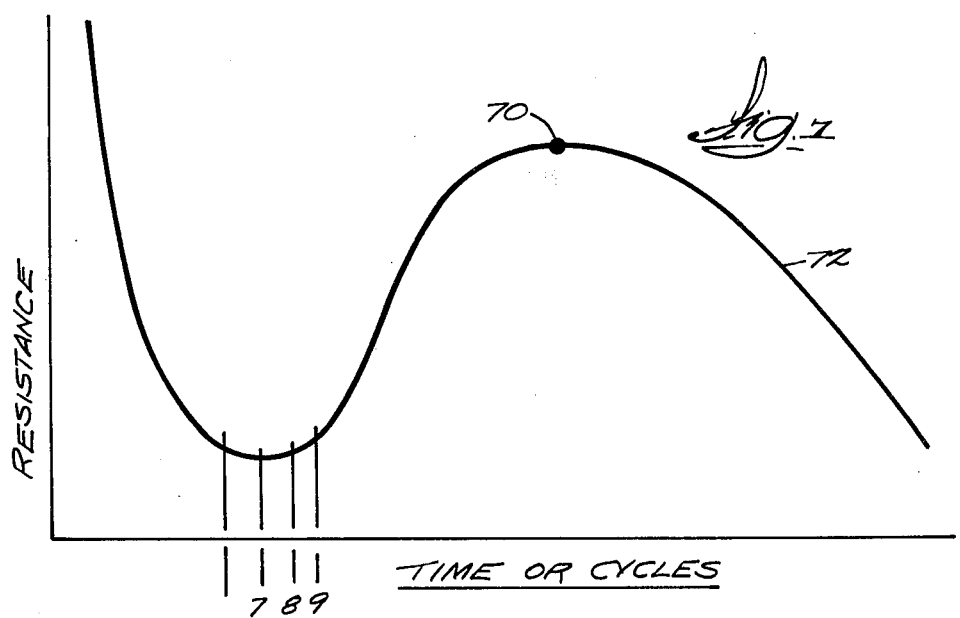
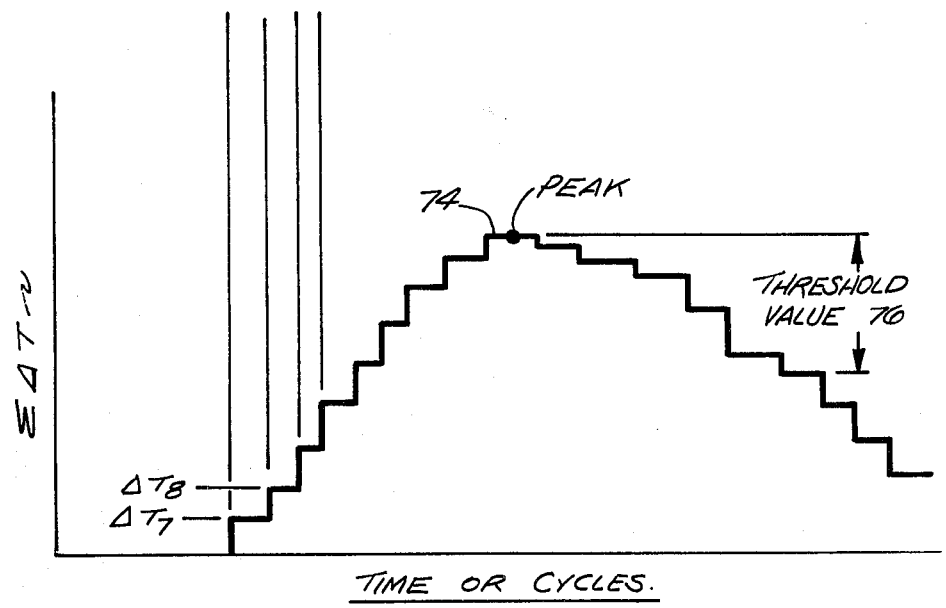

AIR CORE TYPE CURRENT PULSE AND POWER FACTOR MONITORING AND CONTROL SYSTEM FOR A RESISTANCE WELDING APPARATUS

This invention relates to a monitoring and control system for a resistance welding apparatus and is more particularly concerned with a control system that uses the instants half cycle welding current pulses in a secondary winding of a welding current transformer are extinguished to control the duration of a welding current in workpieces.

BACKGROUND OF THE INVENTION

When resistance welding is used to weld two metal parts together, a number of parameters in the welding process may be monitored to consistently provide a quality weld. Typically, the prior art techniques of monitoring weld quality were implemented by attaching or positioning various fragile sensors and their respective leads in direct contact with or in close proximity to the welding electrodes. These monitoring devices and their attendant leads are subject to breakage in industrial environments in which the welding apparatus is required to operate and therefore met with disfavor and were rejected as a means of control because of continual maintainence problems. Examples of the above type of monitoring techniques and associated devices are contained in a publication entitled "Resistance Welding Control and Monitoring" published by the Welding Institute located at Abington Hall, Abington, Cambridge, CB 16A1, United Kingdom, copyrighted 1977.

A control for monitoring a change in resistance across a weld nugget as a weld is formed is disclosed in an application for U.S. patent Ser. No. 197,426 which was filed by the inventor Dennis Jurek on Oct. 16, 1980. The control as disclosed in the Jurek application detects a resistance change across a weld nugget without requiring wires attached to the welding electrodes. The control uses a change in the instants half cycle current pulses in the welding transformer primary winding circuit are extinguished to provide a monitoring signal. One of the disadvantages inherent in the Jurek application control is that the current in the primary winding of the welding transformer, as used to provide a control signal, is not an accurate representation of the welding current in the secondary winding circuit of the welding transformer. While the use of the current in the primary circuit to provide signals possesses advantage that the primary current is considerably less than the welding current in the secondary circuit in any welding apparatus, the current in the primary winding of the welding transformer, is the sum of the welding current in the secondary winding divided by the transformation ratio of the transformer, and the current drawn by the magnetizing branch of the equivalent circuit of the welding transformer. Thus, the current in the primary winding of a welding transformer is not an accurate reflection of the welding current in the welding apparatus.

SUMMARY OF THE INVENTION

In the embodiment of the circuit incorporating the features according to the present invention, the current in the secondary winding of the welding transformer is used to provide a signal indicative of the change in resistance across a weld nugget as a weld is formed between metal workpieces. The control does not require separate external leads attached to the welding electrodes to detect the resistance change across a weld as a weld is formed and uses a simple transducer such as a air core current transformer in the secondary winding circuit of the welding transformer to provide a control signal that is indicative of the quality of a weld as the weld is formed.

Accordingly, it is an object of the present invention to provide a monitoring and control system for a resistance welding apparatus in which the quality of a weld is determined by sensing a change in the instants welding current pulses in the secondary circuit of the welding transformer are extinguished thereby eliminating the necessity of attaching monitoring devices and their associated leads in close proximity to the welding electrodes.

Another object is to provide a monitoring and control system for a resistance welding apparatus in which the quality of a weld is monitored by measuring a decrease in resistance associated with a quality weld as a weld is formed by current in the secondary winding circuit of a welding transformer. The monitoring is accomplished by sensing a change in the instants half cycle welding current in the transformer secondary circuit is extinguished.

An additional object is to provide a control circuit for a resistance welding apparatus. The circuit monitors a change in welding current and thus a change in resistance in metal parts as the parts are welded together. The circuit detects the instants when the half cycles of alternating polarity welding current in the secondary winding of a welder transformer are extinguished and causes the control to execute a control function when a difference in the time intervals between the instant current is initiated and extinguished during a preprogrammed half cycle and subsequent half cycle is at least equal to a preprogrammed value.

Another object is to provide a control circuit for a resistance welding apparatus which monitors the welding current in metal parts as the parts are welded together. The circuit detects the instants when half cycles of alternating polarity welding current in a secondary winding of a welder are extinguished and causes the control to execute a control function when a time interval between a reference instant and the instant current is extinguished during a half cycle subsequent to a preprogrammed half cycle providing the reference instant is at least equal to a preprogrammed value.

A further object of the present invention is to provide a control circuit for a resistance welding apparatus which monitors the welding current and thereby a change in resistance in metal parts as the parts are welded together. The circuit detects the instants when half cycles of alternating polarity welding current are initiated and extinguished in a secondary winding of a welder transformer and causes the control to terminate the weld current when the time interval between the instants when current is initiated and extinguished during a preprogrammed half cycle and a subsequent half cycle is at least equal the preprogrammed value.

An additional object is to provide a control circuit for a resistance welding apparatus which monitors changes in welding current in the secondary winding circuit of a welding transformer and thereby a change in resistance in metal parts as the parts are welded together by welding current output of the secondary winding. The circuit generates a simulated signal indicative of the half cycles of current through the welding apparatus electrodes when the electrodes are positioned to weld without metal parts positioned between the electrodes and a signal indicative of half cycles of actual welding current in the secondary winding circuit while metal parts positioned between the electrodes are welded and terminating the weld current when a time interval between the instants the current is extinguished during a preprogrammed simulated current half cycle and a subsequent half cycle of actual welding current is equal to a preprogrammed value.

Other objects and advantages will become apparent from the description wherein reference is made to accompanying drawings illustrating the preferred embodiment (or embodiments) of the invention and that numerous modifications of alternations may be made therein without departing from the spirit and the scope of the invention as set forth in the appended claims.

BRIEF DESCRIPTION OF THE DRAWINGS

FIG. 1 shows a partial block and schematic representation of a weld quality monitoring control system for a resistance welding apparatus embodying the features of the present invention;

FIG. 2 shows current and voltage verses time waveforms during half cycles of welding current in the circuit of FIG. 1.

FIG. 3 is an output voltage waveform of an air core transformer in FIG. 1.

FIG. 4 is an output waveform of an absolute value module used in the circuit in FIG. 1.

FIG. 5 is an output waveform of a comparator module as used in the circuit in FIG. 1.

FIG. 7 shows a characteristic dynamic resistance curve of mild steel in resistance welding during half cycles of weld current through parts that are being welded together.

FIG. 8 illustrates graphically the reproduction of the curve in FIG. 7 by the controller in FIG. 1.

DESCRIPTION OF A BASIC EMBODIMENT

Figure 6:
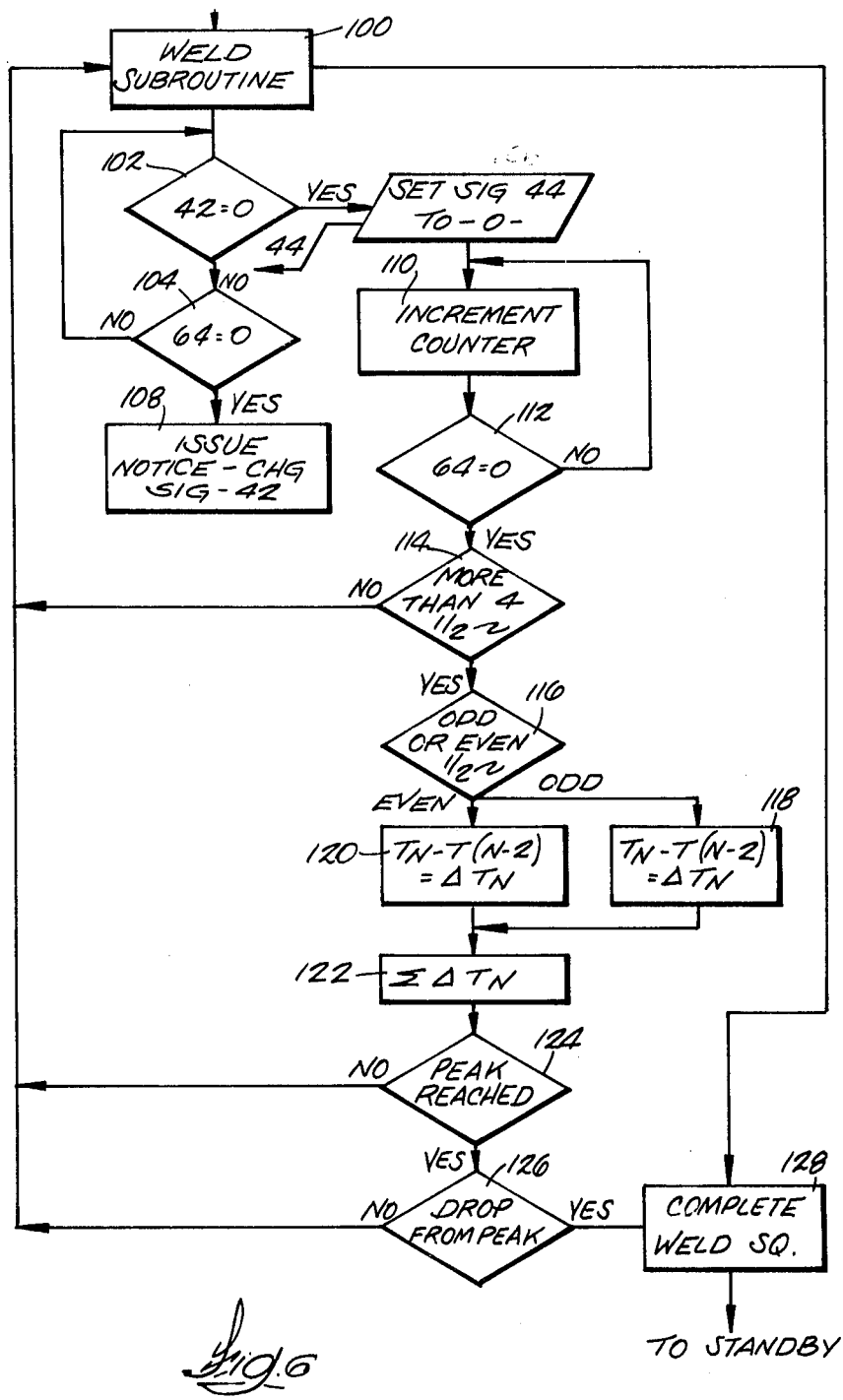
FIG. 6 is a block diagram of a flowchart utilized by the microprocessor in FIG. 1.

In FIG. 1, a controller or monitor 10 for monitoring variations in resistance across a load in response to current through the load is shown in conjunction with a resistance welder apparatus comprising a pair of electrodes 12 and 14 movable by means not shown into clamping engagement with two or more metal workpieces 16 which may vary in thickness and/or electrical resistance. Although the controller 10 described herein is described as being used with a resistance welder, it is apparent that it has other uses in the detection and monitoring of resistance changes and while the controller 10 maybe used with any suitable weld timer it is particularly suited for use with a weld timer and sequencer as disclosed in a U.S. Pat. No. 4,254,446, which issued on Mar. 3, 1981 and assigned by the inventor Dennis J. Jurek to the assignee of the present invention.

The controller 10 includes a sequence module 18 which is arranged to supply input signals to a microprocessor 20 to control the duration and sequence of the typical squeeze delay, squeeze, weld, hold and off periods of a welding apparatus in a manner well known to those skilled in the art. The welding apparatus includes a pair of inversely connected thyristors (SCR's) 22 that control current delivered to a primary winding 24 of a welding transformer 26 from an alternating current source connected to terminals L1 and L2. The transformer 26 includes the primary winding 24, an iron core 28 and a secondary winding 30. The secondary winding 30 is connected in a secondary circuit including the pair of welding electrodes 12 and 14 and a pair of leads 29 and 31 connecting the electrodes 12 and 14 and the secondary winding 30. Current conduction of the SCR's 22 is controlled by signals delivered by a pair of leads 32 to the SCR's 22 from a gate pulse driver circuit 34. the signals on the leads 32 are provided by the gate pulse driver circuit 34 in response to signals that are furnished by the microprocessor 20 through a lead 36.

A simulator or modeling circuit 38 that may be used in the circuit is shown and described in an application Ser. No. 197,426, filed Oct. 26, 1980 and assigned by the inventor Dennis J. Jurek to the assignee of the present invention. The simulator 38 has an input connected by a pair of leads 40 to the terminals L1 and L2 and provides an input signal 42 to the microprocessor 20. The simulator 38 receives an input signal 44 from the microprocessor 20 which gates the operation of the simulator 38 as will be later described. The operation of the microprocessor 20 is described in a U.S. Pat. No. 4,103,724, which was granted on Aug. 1, 1978 to the inventors James A. Dix et al and assigned to the assignee of the present invention. In the '724 patent, the functions provided by an initiating switch 46, the weld sequence module 18 and a lead trail signal 48, as provided by a polarity detector 49 connected across terminals L1 and L2, are fully described.

The circuit in FIG. 1 includes an air core current transformer 50 arranged to be energized by the welding current in the circuit which includes the leads 29 and 31, the welding electrodes 12 and 14 and the secondary winding 30. Preferably, the transformer 50 comprises one or more turns of wire about one of the leads 29 or 31 so that the selected lead acts as a primary transformer winding as it conducts current to the welding electrodes 12 and 14. The pair of terminal ends of one or more turns of wire forming the secondary winding of the air core transformer 50 are connected through a pair of leads 52 to the input terminals of an operational amplifier 54 to provide a voltage signal at the inputs of the amplifier 54 which is a function of the welding current in the secondary winding 30. The output voltage signal of the amplifier 54 is proportional to the derivative of the welding current. The amplifier 54 has an output which supplies an input signal 56 to an absolute value circuit 58 which in turn supplies an input signal 60 to a comparator circuit 62. The circuit 62 supplies an input signal 64 to the microprocessor 20.

In FIG. 2, the numerals 130 and 132 designate the fullwave sinusoidal voltage waveform of the AC supply voltage across the terminals L1 and L2 and the alternating polarity welding current pulse output of the secondary winding 30 respectively. The alternating polarity welding current pulses 132 cause a current to be induced in the air core transformer 50, which, because of the characteristics of air core transformers, causes a voltage signal having a waveform as shown in FIG. 3 to be present across the leads 52. The voltage signal as shown in FIG. 3 is a pulsating signal having positive polarity portions 134A and 134B and negative polarity portions 134C and 134D. The positive polarity portions 134A and 134B are respectively at a maximum positive value at an instant T1 when a positive half of cycle of a weld current pulse is initiated and at an instant T6 when a negative half cycle of a weld current pulse 132 is extinguished. The negative polarity portions 134C and 134D are respectively at a maximum negative value at the instant T3 when a negative half cycle weld current pulse 132 is extinguished and when a negative polarity pulse 132 is initiated an instant T4. At each instant T2 and T5 when the magnitude of the positive polarity pulse 132 and the negative polarity pulse 132 are at a maximum respectively, the di/dt of the pulses 132 are at a minimum and the voltage level of the signal pulses 134 will be zero.

The signals 134 (A-D) as shown in FIG. 3 are delivered by the leads 52 to the amplifier 54 and via the lead 56 to the absolute value circuit 58. An absolute value circuit is a precision rectifier and changes the value of its inputs so all values of its output signal have the same polarity. Thus, the absolute value circuit 58 changes the voltage signals shown in FIG. 3 to the voltage signals shown in FIG. 4 wherein the pulses 134 (A-D) are of like polarity. The signal pulses 134 (A-D) as shown in FIG. 4 are supplied by the lead 60 as inputs to the comparator 62 which responds to the inputs and provides input signals shown in FIG. 5, via lead 64 to the microprocessor 20.

As shown in FIG. 5, the signal 64 is initiated at instants T1 and T4 when the positive and negative polarity current pulses in the secondary winding 30 are respectively initiated. The signal pulses 64 are terminated at instants T3 and T6 when the positive and negative polarity current pulses in the secondary windings are respectively extinguished. Further, at the instants T2 and T5, the magnitude of the current pulses 134 is maximum and the di/dt equals zero so that for a brief interval the signals on the lead 64 are absent. The circuit is arranged to ignore the momentary signal absence and respond to the instants when the pulses are initiated at times T1 and T4 and extinguished at instants T3 and T6.

The microprocessor 20 preferably comprises an 8-bit Motorola M6800 microprocessor and its associated hardware and auxillary devices. The microprocessor 20 receives line voltage polarity information from the polarity detector 49 via the input 48 as well as the state of weld current via the signal 64. During the weld period, as dictated by a signal 66 from the sequence module 18, the microprocessor 20 delivers appropriately timed gate signals 36 to the gate pulse driver 34. The driver 34 in response to signals 36 delivers firing signals via the leads 32 to the gates of the welding SCR's 22 so that the conduction of the SCR's 22 is based on input data such as the desired welding current and the duration of the weld period as preprogrammed in the microprocessor 20 via the sequence module 18 as described in the '724 patent. The microprocessor 20, based on a preprogrammed analysis of the signal 64 in view of the signals 42 or 48, terminates the weld current when a preprogrammed state of the preprogrammed signals exists.

Referring to a partial flow chart as shown in FIG. 6, the operational sequence of the welding control system in the instant application is similar to that disclosed in an application for U.S. patent, Ser. No. 223,520 filed Jan. 9, 1981 as a continuation in part of an application that matured into a patent, No. 4,254,466 issued Mar. 3, 1981 and assigned by the inventor Dennis J. Jurek to the assignee of the present invention. Upon initiation of a weld sequence by the initiating switch 46 and the completion of squeeze time as indicated by the signal 66 from the sequence module 18, the microprocessor 20 leaves the squeeze routine and enters a weld subroutine 100. During the squeeze routine the welding electrodes 12 and 14 are moved into engagement with the work pieces 16. The weld subroutine 100 includes certain checks and timing information necessary to fire the SCRs 22 in the welding contactor at the appropriate time. Upon generation of the signals 36 and 32, which initiate the firing of the SCR's 22, the microprocessor 20 issues the signal 44 which in one embodiment of the present invention initiates the operation of the simulator or modeling circuit 38.

Control is then transferred to a decision block 102 which tests the state of the signal 42. If the signal 42 is not a logic zero, control is then transferred to block 104. If the signal 42 is a logic zero, control is transferred to an output block 106 the significance of which will be later described. Block 104 then tests the state of the signal 64. If the signal 64 is a logic zero, control transfers to a block 108. The significance of the operation of the block 108 will be later described. If the signal 64 is a logic 1, control transfers from the block 104 and is returned to the block 102. The control remains in a loop defined by the blocks 102 and 104 until one of the signals 42 or 64 is detected as a logic zero. If the signal 42 is detected as a logic zero prior to the detection of the signal 64 as a logic zero, control transfers to block 106.

The output block 106 sets the signal 44 to a logic zero which terminates the operation of the simulator 38 thus simulating the action of SCR's 22 in the weld contactor. Control is then transferred to the time loop made of up blocks 110 and 112. Block 110 increments a timing counter within the microprocessor 20 for every traverse of the loop made up of blocks 110 and 112. Decision block 112 terminates the traverse of the loop when the signal 64 becomes a logic zero indicating extinction of the actual weld current. Thus the timing counter within the microprocessor 20 contains a count of the number of traversals of the loop defined by blocks 110 and 112 which is a measure of the time interval between the switching of the signals 42 and 64 in that order to a logic zero. Control then transfers to a block 114.

As previously mentioned, if the signal 64 becomes a logic zero prior to the signal 42 becoming a logic zero, control is transferred to the block 108. This occurs when a potentiometer 68 in the modeling circuit 38 is improperly adjusted which causes the signal 42 to be extinguished after the actual weld current signal 64 is extinguished. Block 108 issues a diagnostic message advising that the power factor of the simulator circuit 38 should be increased by adjusting potentiometer 68. The potentiometer 68 is incrementally adjusted and another weld is initiated. The adjustment of the potentiometer 68 is repeated until the signal 42 is extinguished before signal 64 and welds are completed without a diagnostic message from block 108.

The decision block 114 is used to prevent an analysis of the time data during the first few half cycles of a weld period because the resistance of work pieces 16 varies indeterminately during the beginning of the weld period and thus does not produce reliable data. The timing data occuring during the first four half cycles of the weld period is ignored by the block 114 and the results of half cycles 5 and 6 are retained and respectively stored in the odd or even memory storage locations in the microprocessor 20. Control of the weld is returned from the decision block 114 to the weld subroutine 100 during the first six half cycles of the weld period. Beginning with the seventh half cycle, the decision block 114 control is transferred to a decision block 116 which determines whether a half cycle under consideration is numerically odd or numerically even. In the case of the seventh half cycle, which is odd, the control is transferred to an arithmetic block 118 where the time $T_7$, in 5 microseconds increments, has subtracted from it the time of the previous odd half cycles, e.g. time $T_5$ which was previously stored in the microprocessor 20 memory. Therefore, the arithmetic equation is $T_n - T_{n-2} = \Delta T_n$. Thus the result of this subtraction forms Delta $T_7$. In the next half cycle which is an even numbered half cycle, a arithmetic block 120 is used as a control for form Delta $T_8$ which is equal to time $T_8$ minus time $T_6$ ($\Delta T_8 = T_8 - T_6$). In this manner, the Delta T's for all the subsequent half cycles are formed. Preferably, the Delta T's are determined on an odd minus odd and even minus even basis to cancel polarity sensitive timing errors such as rectification at the welding tips due to oxide and other impurities, or unequal response times of the SCR's 22 in the welding contactor.

It can be demonstrated that for small changes in resistance, the Delta T's derived in the foregoing manner are proportional to the negative time derivative of the resistance versus time function of the dynamic resistance curve produced during the progress of a weld. To reconstruct a numerical representation of the resistance versus time function suitable for analysis by the microprocessor, it is necessary to form a negative integral of the Delta T function. In numerical terms, this is accomplished by a summation operation performed in summation block 122. If the output of the block 122 is plotted with respect to time or weld cycles, a curve similar to FIG. 8 results which is an approximation of the dynamic resistance curve shown in FIG. 7. The height of the curve in FIG. 8 at any instant is equal to sum of the preceding Delta T's.

Studies of weld strength versus resistance across the weld area demonstrate that a quality weld will be achieved if weld current is continued until the resistance across the weld is reduced a predetermined amount after a peak 70 on a curve 72 in FIG. 7 is reached, as approximated by a peak 74 in FIG. 8. A decision block 124 determines if a peak in the data from the block 122 has occurred. If a peak is reached, a decision block 126 measures the drop from the peak value 74 in FIG. 8 and compares the value of the drop to a threshold value 76 as seen in FIG. 8 which is a preselected value. If the peak is not reached, the control exits decision block 124 and returns to the weld subroutine 100 to continue a weld. If the drop from the peak 74 is equal to or greater than the threshold value as determined by decision block 126, the microprocessor 20 does not return to the weld subroutine 100 to continue the weld and transfers control to an operation block 128 where the operations such as "hold" that complete the weld sequence are performed. Exiting operation block 128, the microprocessor 20 returns to the standby mode. In the event block 126 does not transfer control to block 128 before the preprogrammed weld cycle counts have been reached, control is transferred from block 100 directly to block 128. Block 128 terminates the weld at its maximum duration and begins a hold period as described in the '724 patent.

As described in an application Ser. No. 197,426 for a U.S. patent which was filed by the inventor Dennis Jurek on Oct. 16, 1980 the signal 42 is a signal analogous to a signal which would be provided by welding current in the primary winding of the welder transformer. When the resistor 68 is properly adjusted the waveform of the signal 42 and the signal across the leads 52 will be substantially identical in time of initiation, shape and time of extinction. However, the signal 42 is not influenced by the resistance changes of workpiece 16. The formation of a weld between the work pieces 16 will cause a decrease in resistance between the work pieces 16 and a corresponding increase in magnitude of the welding pulses of welding current. The increased magnitude of the current pulses is evidenced by a progressive increase in the interval between the instant of occurance of the signal 42, which may be designated as a reference instant, and the instant when the signal 64 is extinguished which is detected by the air core transformer 50. If line voltage noise and transients are not a problem, the circuitry supplying the signal 42 may be replaced by a polarity detector which furnishes the signal 48 to the microprocessor 20. Under normal conditions the signal 48 will be a signal that changes polarity each instant when the polarity of the voltage signal 130 changes. This change in polarity can be used as a reference instant to replace the signal 42 and used as a control signal in the same manner as the signal 42 is used to control the operation of the controller 10. Further if desired the signal from the air core transformer 50 can be used to terminate the weld current when the resistance across the weld nugget has change by a preprogrammed amount. Referring to FIGS. 2 and 5, during the first half cycle of weld current the current pulse is initiated at time T1, reaches a maximum at time T2 and is extinguished at time T3. Thus, an interval between the instant a current pulse is initiated and extinguished can be determined as measured counts by the microprocessor 50 and retained in the microprocessor 50 memory. It is apparent from the FIGS. 2 and 5 that as a weld nugget is formed the interval between the instants T1 and T3 for odd numbered welding current pulses and T4 and T6 for even numbered welding current pulses will increase and an acceptable quality weld will be detected with the interval between T1 and T3 or T4 and T6 is equal to a preprogrammed value which can be used to terminate the weld current when the detected interval equals the preprogrammed value.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A power factor monitoring and control system for controlling the quality of a weld in a resistance welding apparatus with said apparatus including a welding transformer having primary and secondary circuits, an A.C. line voltage applied to the primary circuit and a load in the secondary circuit comprising:

means connected in circuit with the primary circuit for detecting a polarity change in the voltage applied to the primary circuit to generate a first logic signal, means including an air core transformer connected in circuit with the secondary circuit for providing an analog signal proportional to the derivative of the welding current and means responsive to said analog signal for detecting the instants current is extinguished in the secondary circuit at the end of half cycles of current in the weld to generate a second logic signal;

means responsive to the first and the second logic signals for measuring a time interval between the occurrence of the first and the second logic signals, means for converting the measured time intervals into a representation of a resistive change in the load circuit; and means for comparing the representation to a preselected threshold value of resistive change representing a quality weld and terminating the weld current when the compared representation is equal to or greater than a preselected threshold value.

2. The control system of claim 1, wherein said first logic signal detecting means is a polarity detecting circuit which senses the zero crossing of the line voltage and in response thereto generates said first logic signal.

3. The control system of claim 1, wherein said second logic signal detecting means is an air core current transformer connected to sense the current in the secondary circuit and provide the second logic signal the instant current is extinguished at the end of each half cycle of conduction.

4. In a monitoring and control system for controlling the quality of a weld in a resistance welding apparatus including a welding transformer having primary and secondary circuits, a line voltage applied to said primary circuit, a method of determining a resistive change in the secondary circuit of the welding transformer during a weld cycle by measuring the instants current is extinguished in the secondary circuit during intervals of weld current conduction comprising the steps of:

detecting a zero crossing of the voltage in the primary circuit of the welding transformer to generate a first logic signal;

detecting current extinction in the secondary circuit at the end of each half cycle of current conduction in a weld through an air core transformer to generate a second logic signal;

measuring the time interval between the occurrence of the first and the second signals on each half cycle of current condition;

converting the measured time intervals into a representation of the resistive change taking place in the secondary circuit as the weld progresses;

comparing a portion of the representation to a preselected threshold value of resistive change indicating a quality weld for that particular material; and terminating the weld when the numerical representation is equivalent to the threshold value.

5. A control system for controlling the quality of a weld formed by a weld resistance welding apparatus with the apparatus including a pair of welding electrodes and a welding transformer having a secondary winding connected to the electrodes and a primary winding connectible to an AC source for energizing the primary winding and the secondary winding with alternating polarity half cycles of welding current comprising:

means connected to the primary winding for measuring the change in voltage polarity; means including an air core transformer energized by current in the secondary winding for measuring a change in an interval between the instant when current is initiated and the instant when current is extinguished in the secondary winding during a preprogrammed half cycle and at least one subsequent half cycle; and means for terminating the weld current when the measured change is at least equal to a preprogrammed threshold value indicative of a quality weld.

6. A method for controlling the quality of a weld that is formed by a resistance welding apparatus with the apparatus including a pair of welding electrodes engageable with a pair of workpieces that are to be welded together and a welding transformer having a secondary winding connected to the electrodes and a primary winding connectible to an AC source for energizing the primary and the secondary winding with alternating polarity half cycles of welding current comprising:

providing means including an air core transformer energized by current in the secondary winding for providing a signal indicative of an occurrence of a reference instant and an instant weld current is extinguished in a preprogrammed half cycle of weld current and subsequent half cycles of weld current in a weld;

measuring the duration of intervals between the reference instant and the instant weld current is extinguished during the preprogrammed half cycle and the intervals between the reference instant and the instant weld current is extinguished during subsequent half cycles; and, terminating the welding current when a difference between measured interval of the preprogrammed half cycle and a subsequent half cycle is at least equal to a preprogrammed threshold value indicative of a quality weld.

7. A control system for controlling the quality of a weld in a resistance welding apparatus with the apparatus including a pair of welding electrodes that are engageable with workpieces to be welded together and a welding transformer having a secondary winding connected to the electrodes and a primary winding connectible to an AC source for energizing the primary and the secondary winding with alternating polarity half cycles of actual welding current comprising:

a modeling circuit responsive to current in the primary winding and closely matched in electrical response to a circuit including the electrodes and excluding the workpieces for providing an ersatz reference signal that simulates the instant when each half cycle of weld current pulses sans the workpieces is extinguished;

means including an air core transformer providing an actual weld signal indicative of the actual welding current in the secondary winding and the instant when each half cycle of actual welding current is extinguished;

means for measuring a time difference between the eratz signal and the actual weld signal during a half cycle when the value of the time difference between the signals is minimum and storing the value of the minimum difference; and means for interrupting the actual welding current in the primary winding when the difference between the minimum difference value and a signal indicative of the difference between the ersatz signal and the actual weld signal during a half cycle subsequent to the half cycle producing the minimum difference value is greater than or equal to a preprogrammed value.

8. A control system for controlling the quality of a weld as a weld is formed in a resistance welding apparatus with the apparatus including a pair of welding electrodes and a welding transformer having a secondary winding connected to the electrodes and a primary winding connectible to an AC source for energizing the primary winding and the secondary winding with alternating polarity half cycles of welding current comprising:

means including an air core transformer energized by current in the secondary winding providing signals indicative of instants when half cycles of welding current in the secondary winding is maximum and when half cycle welding current is extinguished, means for measuring an interval between the instant when welding current is maximum and when welding current is extinguished and means responsive to the interval for terminating the welding current when the difference between a measured interval and a subsequently measured interval equals a predetermined value.

* * * * *